United States Patent
Srikantaiah et al.

(10) Patent No.: US 9,436,617 B2
(45) Date of Patent: Sep. 6, 2016

(54) DYNAMIC PROCESSOR-MEMORY REVECTORING ARCHITECTURE

(71) Applicant: Texas Instruments, Incorporated, Dallas, TX (US)

(72) Inventors: Hemanth Mullur Srikantaiah, Bangalore (IN); Sankar Prasad Debnath, Bangalore (IN); Kalpana Suryawanshi, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 154 days.

(21) Appl. No.: 14/105,852

(22) Filed: Dec. 13, 2013

(65) Prior Publication Data

US 2015/0169223 A1 Jun. 18, 2015

(51) Int. Cl.
*G06F 12/00* (2006.01)
*G06F 12/10* (2016.01)
G06F 3/06 (2006.01)
G06F 12/02 (2006.01)

(52) U.S. Cl.
CPC .......... *G06F 12/1081* (2013.01); *G06F 12/023* (2013.01); *G06F 2003/0697* (2013.01)

(58) Field of Classification Search
None
See application file for complete search history.

(56) References Cited

U.S. PATENT DOCUMENTS

| | | | |
|---|---|---|---|
| 5,657,026 A * | 8/1997 | Culpepper et al. | 342/374 |
| 7,657,696 B2 * | 2/2010 | Su et al. | 711/103 |
| 7,802,025 B2 * | 9/2010 | Chen et al. | 710/22 |
| 2002/0010844 A1 * | 1/2002 | Noel et al. | 711/153 |
| 2002/0032844 A1 * | 3/2002 | West | 711/171 |
| 2002/0120709 A1 * | 8/2002 | Chow et al. | 709/213 |
| 2002/0147957 A1 * | 10/2002 | Matsui et al. | 716/11 |
| 2004/0003314 A1 * | 1/2004 | Witt et al. | 714/6 |
| 2004/0054857 A1 * | 3/2004 | Nowshadi | 711/153 |
| 2008/0065855 A1 * | 3/2008 | King et al. | 711/207 |
| 2008/0186993 A1 * | 8/2008 | Dellacona | 370/423 |
| 2008/0243468 A1 * | 10/2008 | Bohizic et al. | 703/26 |
| 2010/0214301 A1 * | 8/2010 | Li et al. | 345/522 |
| 2011/0193744 A1 * | 8/2011 | Warloe | G01S 19/33 342/357.73 |
| 2012/0243304 A1 * | 9/2012 | Hoya | 365/158 |
| 2012/0271836 A1 * | 10/2012 | Coker | G06F 17/3087 707/749 |
| 2012/0317339 A1 * | 12/2012 | Gissel et al. | 711/103 |
| 2012/0331255 A1 * | 12/2012 | Fuks et al. | 711/163 |
| 2015/0098494 A1 * | 4/2015 | Van Den Dungen | 375/149 |

* cited by examiner

*Primary Examiner* — Baboucarr Faal (74) *Attorney, Agent, or Firm* — Lawrence J. Bassuk; Frank D. Cimino (57) ABSTRACT

A global navigation satellite system (GNSS) includes an efficient memory sharing architecture that provides additional search capacity by, e.g., sharing a portion of GNSS receiver processor memory with a general processor. A memory management unit dynamically revectors memory accesses in accordance with the various states of the GNSS receiver processor and arranging the available memory as a shared memory bank that can be efficiently shared between the general processor and the GNSS receiver processor. An optional ancillary memory system can provide additional memory to the general processor when the GNSS receiver processor has allocated memory that the general processor would otherwise use.

6 Claims, 6 Drawing Sheets

DYNAMIC PROCESSOR-MEMORY REVECTORING ARCHITECTURE

BACKGROUND

The integration of global navigation satellite systems (GNSS) into various mobile devices continues to increase at significant rates. The integration of GNSS into various mobile devices places even higher processing requirements upon the mobile devices. High performance GNSS functionality is measured, for example, by factors such as sensitivity and time-to-first location fix (TTFF). The degree of sensitivity and the speed of TTFF are both affected by the available search capacity of the processor of the mobile device. The capability of the search capacity is affected by the clocking rate of the GNSS correlator and the memory available to the processor. The increased hardware resources used to implement the GNSS functionality thus increases the power and area requirements, which in turn entails increased costs of the GNSS-enabled mobile devices.

SUMMARY

The problems noted above can be solved in large part by a global navigation satellite system (GNSS) includes an efficient memory sharing architecture that provides additional search capacity by, e.g., sharing a portion of GNSS receiver processor memory with a general processor. A memory management unit dynamically revectors memory accesses in accordance with the various states of the GNSS receiver processor and arranges the available memory as a shared memory bank that can be efficiently shared between the general processor and the GNSS receiver processor. An optional ancillary memory system can provide additional memory to the general processor when the GNSS receiver processor has allocated memory that the general processor would otherwise use.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and thus are to be interpreted to mean "including, but not limited to . . . . " Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections.

Figure 1:
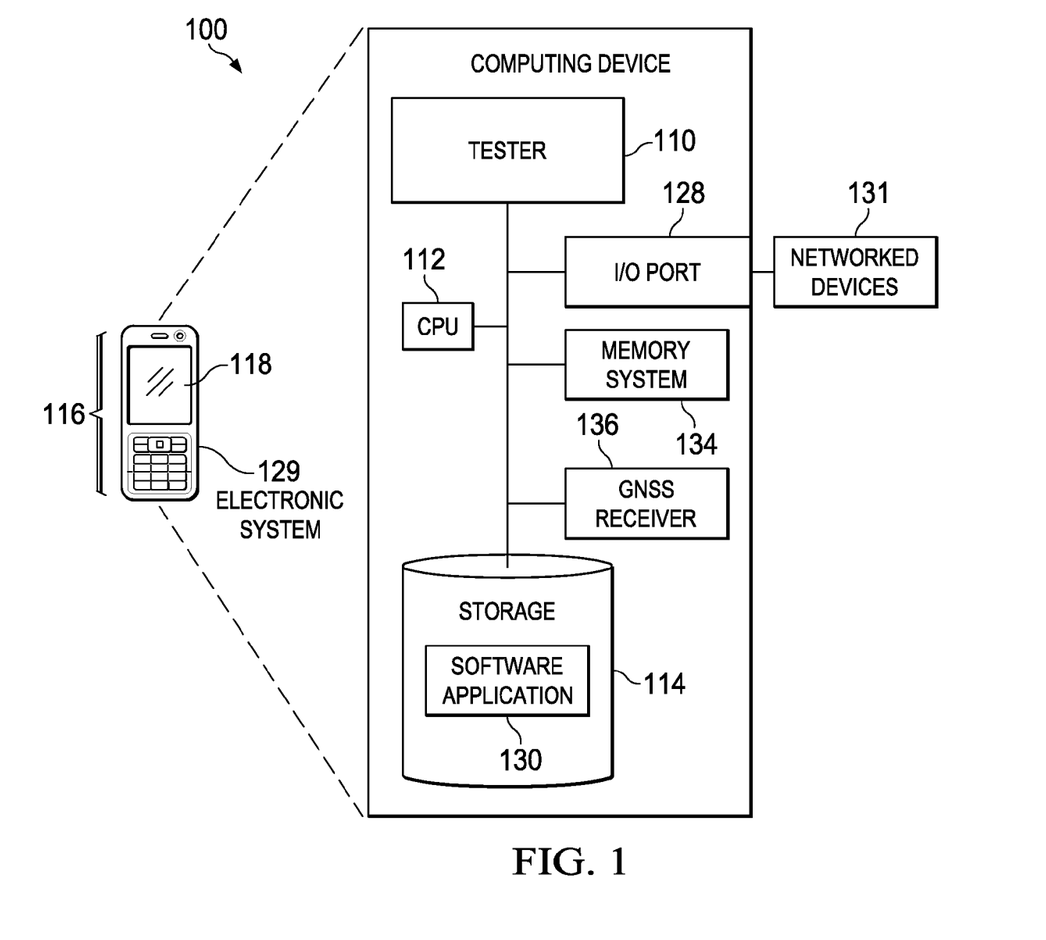
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a mobile device, a personal digital assistant, a personal computer, electronics control "box" or display, a navigation system, or any other type of electronic system. The computing device 100 can be powered from line current and/or battery storage.

In some embodiments, the computing device 100 comprises a megacell or a system-on-chip (SoC) which includes control logic such as a CPU 112 (Central Processing. Unit), a storage 114, and tester 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 can be volatile or non-volatile memory such as on-processor cache, off-processor cache, RAM (read and write memory), flash memory, and disk storage. The storage 114 stores one or more software applications 130 (e.g., embedded applications) that, when executed by the CPU 112, perform any suitable function associated with the computing device 100.

The tester 110 is a monitoring system and comprises logic (embodied at least partially in hardware) that supports monitoring, testing, and debugging of the computing device 100 executing the software application 130. For example, the tester 110 can emulate one or more defective or unavailable components of the tester 110 to allow verification of how the component(s), were it actually functional on the computing device 100, would perform in various situations (e.g., how the components would interact with the software application 130). In this way, the tester 110 can be debugged in an environment which resembles post-production operation.

The CPU 112 comprises memory and logic that store information frequently accessed from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and mechanical devices such as keypads, switches, proximity detectors, and the like. The CPU 112 and tester 110 is coupled to I/O (Input-Output) port 128, which provides an interface that is configured to receive input from (and/or provide output to) networked devices 131 such as peripherals and/or computing devices, including tangible media (such as flash memory) and/or cabled or wireless media. These and other input and output devices are selectively coupled to the computing device 100 by external devices using wireless or cabled connections.

The computing device 100 includes memory system 134, which is arranged to provide (e.g., closely coupled, and thus relatively fast) memory access for CPU 112 and GNSS (global navigation satellite system) receiver 136. The GNSS receiver 136 typically uses 4-8 kilobytes ("kB" or "K") of memory for each satellite channel that is used. New generations of GNSS-enabled receivers generally include algorithmic improvements in receiver processing and larger number of channels used to provide higher performance.

At the present, next-generation receivers typically use 45 satellite channels to achieve customer and market performance targets (in comparison, previous generation GNSS receivers typically use 104 kB of RAM to process 24 channels). The increase in the number of channels over prior and current generations of GNSS receivers normally results in increasingly higher memory requirements for the GNSS receiver 136, which entails a corresponding increase in area, cost and power consumption. Moreover, increasing numbers and types of global positioning satellite (GPS) constellations are being planned and/or launched. The greater numbers and diversity of channels present further increases in search capacity processing requirements (e.g., searching for a greater number of channels) that are used to provide even higher performance.

In accordance with an example embodiment, memory system 134 is disclosed having dynamically shared processor memory that substantially reduces (e.g., GNSS) receiver core RAM requirements. (A substantial reduction in core RAM requirements is, for example, a noticeable reduction in cost and/or power consumption of the chip that incorporates the memory system 134.) In the example embodiment, the memory system 134 provides shared memory that allows processing (e.g., satellite channel acquisition) of 45 channels while maintaining a memory size of, for example, 104 kB core receiver RAM. The shared memory having 104 kB provides greater processing capability even without providing additional RAM.

The shared memory is, for example, core memory that is provided as part of a pre-designed "intellectual property" core that includes (and thus is closely coupled to) a local processor (such as the receiver processor or the general processor). For example, the receiver processor can be provided as a first pre-designed core (e.g., designed by a first design house) and the general processor can be separately designed as a second pre-designed core (e.g., designed by a second design house that is different from the first design house). The shared memory can be shared by providing a common bus that closely couples (e.g., using a fast 32-bit wide bus) the shared memory between the first and second pre-designed cores. The shared memory is generally capable of being accessed at higher rates than memory (such as "guest memory") that is not as closely coupled to the local processor.

Accordingly, an efficient memory sharing architecture is disclosed that provides additional search capacity without requiring an increase in the amount of dedicated memory. The disclosed memory sharing architecture is arranged to share a portion of the (e.g. core) receiver processor memory with the general processor by dynamically revectoring memory accesses and arranging the available memory as a shared memory bank (e.g., that is shared between the general processor and the receiver processor). As discussed below with respect to FIG. 2, a memory management unit (MMU) is arranged to revector memory accesses to the shared memory bank in accordance with application requirements.

Figure 2:
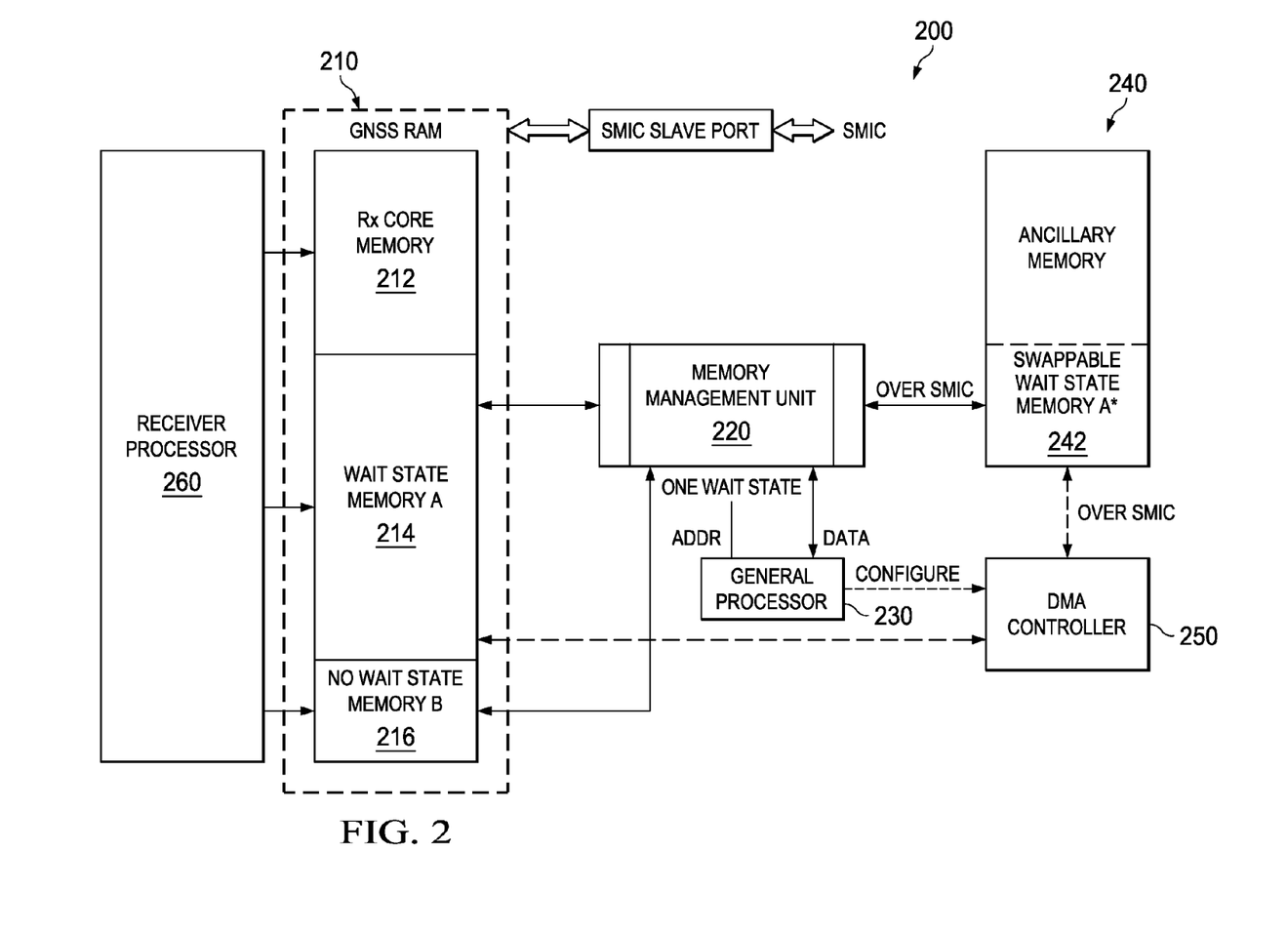
FIG. 2 is a block diagram illustrating a dynamic processor-memory revectoring system in accordance with example embodiments of the disclosure.

FIG. 2 is a block diagram illustrating a dynamic processor-memory revectoring system in accordance with example embodiments of the disclosure. Generally described, the dynamic revectoring processor memory system 200 includes a unified RAM 210 that is coupled to memory management unit (MMU) 220. Unified RAM 210 includes receiver (RX) core memory 212, wait state memory ("Memory A") 214, and no-wait state memory ("Memory B") 216.

No-wait state memory 216 has generally faster access times than wait state memory 214, but may be subject (in operation) to encountering "wait states" depending on the clock speed of a device accessing the given memory in various embodiments (notwithstanding being described as "no-wait state" memory). Thus, information that is accessed frequently and/or as quickly as possible is generally stored in faster memory (such as no-wait state memory 216) and information that is less frequently accessed and/or is not as time-critical can be stored in slower memory (such as wait state memory 214).

MMU 220 is coupled to processor 230 and is arranged to vector (e.g., direct, redirect, translate and/or remap addresses of) memory access requests in accordance with a particular operating mode. For example, in a first mode the MMU is arranged to vector memory access requests from general processor 230 to wait state memory 214 or no-wait state memory 216. In a second mode, MMU 220 is arranged to vector memory access requests general processor 230 to the ancillary memory 240.

Ancillary memory 240 is memory that is, for example, instantiated for local use by a networking subsystem. The ancillary memory 240 is, for example, closely coupled to peripheral processors such as WAN, LAN, Bluetooth, and other such peripheral controllers or devices on the same substrate. Accordingly, ancillary memory 240 is (e.g., because of cost concerns and less demanding requirements) typically slower memory than the memory that is more closely coupled to high-performance processors (e.g., general processor 230 and the receiver processor 260). As disclosed herein, the ancillary memory 240 is arranged to make available a portion of its memory as "guest RAM" for use by other processors such as the general processor 230.

In an example application, the general processor 230 is arranged initially to access a portion of unified RAM 210 using a closely couple bus. Subsequently, a memory-intensive phase of processing (such as a pilot channel acquisition phase in which satellite channels are acquired by a receiver) is entered that typically requires a high level of increased search capability. To prepare for the memory-intensive phase, the memory is allocated by the MMU 220. For example, the MMU 220 allocates (and/or reallocates) available ancillary memory (such as ancillary memory 240) for exclusive use by the general processor 230, which frees up memory locations (such as memory that is local to the general processor) that can be in turn (re-) allocated for use by receiver processor 260.

Allocating the freed-up processor memory for use by the receiver processor 260, e.g., increases the search capabilities of the receiver processor 260. The freed-up memory is typically zero-wait state memory that is closely coupled to both the general processor 230 and the receiver processor 260. After the memory-intensive phase of processing, the search capacity requirements are substantially reduced because the extensive resources no longer need be used for initial satellite channel acquisition, and thus the freed-up memory can be reallocated by MMU 220 for use by the general processor 230.

The DMA controller 250 is optionally arranged to selectively transfer contents of memory in response to indications of changes in an operating mode. (The selected memory contents can be selectively transferred by using processor-generated memory access commands and/or by using a DMA controller.) Memory accesses controlled by the DMA controller 250 can be accomplished using an SMIC (shared memory interconnect) bus interface (which, e.g., minimizes the number of interconnections required for the memory access bus to the ancillary memory 240). The SMIC is a bus that typically has longer propagation delay and hence one or more wait-states are typically incurred when a memory is accessed over the SMIC bus.

To prepare for a first operation mode (such as a satellite acquisition mode) selected contents (e.g., contents that are used by the general processor 230) of faster memory of the receiver core memory (such as wait state memory 214) can be moved to slower memory (such as such as wait state memory 214 and/or swappable wait state memory 242 of ancillary memory 240). For example, selected contents that are used by the general processor 230 of no-wait state memory 216 can be moved into wait state memory 214 by using memory previously freed-up by moving selected contents of wait state memory 214 to swappable wait state memory 242. After the memory contents have been selectively transferred, the freed-up memory (e.g., previously shared with the general processor 230) is made available for use by the receiver processor 260.

To prepare for a second operation mode (such as after satellite acquisition has been completed), the selected contents of memory can be moved from slower memory (such as swappable wait state memory 242) and moved to faster memory (such as wait state memory 214 and/or wait state memory 216). Likewise selected contents (e.g., used by general processor 230) can be moved from wait state memory 214 to no-wait state memory 216.

In an example embodiment, the receiver and the processor are arranged on a common substrate (e.g., silicon substrate). Because the receiver and the general processor are arranged on a common substrate, the unified RAM 210 can be accessed using wide parallel busses that are arranged across the common substrate. The use of wide parallel busses that are arranged across the common substrate reduces the number of cycles that would otherwise be required for accessing the RAM 210 by a processor that (for example) is not formed in the same substrate or closely coupled on the same substrate. In the example embodiment, the unified RAM 210 (which is capable of being shared with the receiver core) is arranged in parallel banks of memory using four eight-bit busses to access each bank (which helps to reduce memory latency). The reduced memory latency allows each added channel to be accessed at a rate of 3.2 MHz.

Figure 3:
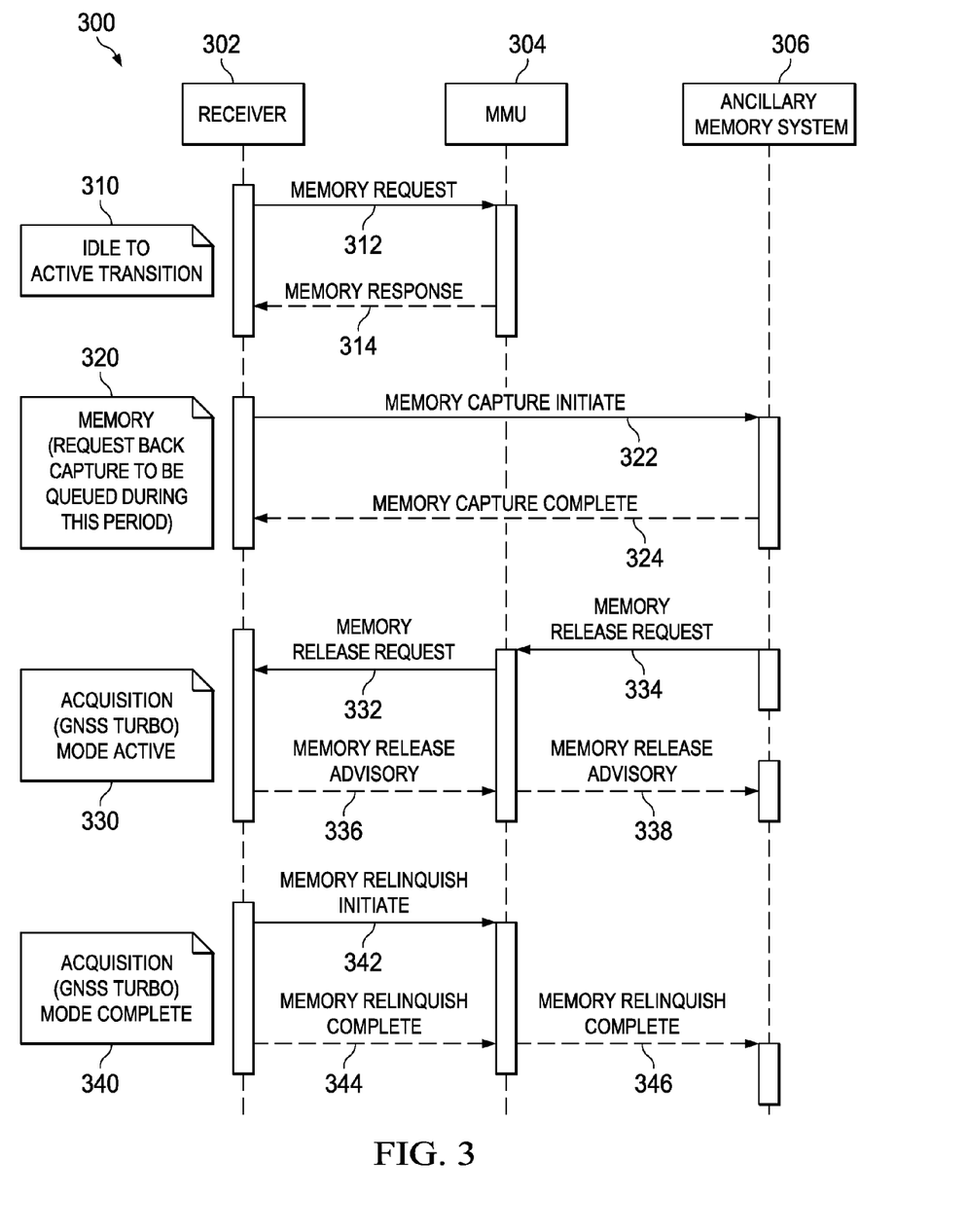
FIG. 3 is a signal flow diagram that illustrates memory reallocation in a dynamic processor-memory revectoring system in accordance with example embodiments of the disclosure.

FIG. 3 is a signal flow diagram that illustrates memory reallocation in a dynamic processor-memory revectoring system in accordance with example embodiments of the disclosure. Time-diagram 300 illustrates communications transmitted and received between and amongst the receiver 302 (e.g., GNSS receiver 136), MMU 304 (e.g., MMU 220), and ancillary memory system 306 (that includes, e.g., ancillary memory 240).

During state 310, the receiver 302 is arranged to transition from an idle state to an active state. When the receiver 320 transitions from an idle state to an active state, communication 312 is sent from the receiver 302 to the MMU 304 that requests memory to be (re-) allocated for use by the receiver 302. (The memory requested is, for example, closely coupled to the receiver 302 such that the requested memory can be accessed by the receiver 302 without causing a decrease in performance that is noticeable by a user of the device incorporating the receiver 302.) In response to communication 312, the MMU allocates additional memory and sends a response to the receiver 302 via communication 314 to inform the receiver 302 that the requested memory has been allocated.

During state 320 ("memory capture"), selected contents of the memory of the receiver 302 are captured by copying a portion (e.g., the entire portion or a smaller portion) of the selected contents to the allocated memory. When the receiver 302 transitions into the memory capture state, communication 322 is sent from the receiver 302 to the ancillary memory system 306 that initiates the transfer of the selected contents of memory to the allocated memory ancillary memory system 306. (The capture can be accomplished using DMA and/or processor control memory by copying and reallocating the memory on a byte-by-byte basis.) When the memory capture is complete, the ancillary memory system 306 notifies the receiver 302 as to the completion via communication 324.

For example, a memory capture that is performed using DMA Controller 250 can be accomplished in 500 microseconds when four banks of 180 kB total of memory are accessed at a rate of 90 MHz. The MMU 304 can be associated with a general processor (that is, for example, freeing up memory for use by the receiver 302 that the general memory previously used). The MMU is arranged to update the address map such that the contents of the captured memory can be safely access by the general processor after page transfer (e.g., when an address is can be address as a function of the original address and the page address: new address=function (page address, old address). The general processor is still able to access the swapped blocks of memory via the SMIC bus (discussed above). Further, the memory freed-up (e.g., by swapping the contents and redirecting access by the general processor) provides extra memory space that is used to acquire satellite channels by the receiver 302. Access to the extra memory space can be granted in response to an interrupt generated by the DMA controller 250 upon completion of page transfer. The receiver 302 can access the freed memory without redirection (e.g., address translation) to maximize access speed.

During state 330, the receiver 302 enters a processor-intensive phase during which satellite channels are identified and acquired ("acquisition mode active" state). When the MMU 304 determines (and/or is notified of) the need to reclaim the (e.g., donated) memory freed-up, the MMU 304 generates memory release requests 334 and 332 (which remain pending until after the end of the acquisition mode active state). Memory release request 332 is sent to the receiver and memory release request 334 is sent to the MMU 304 for the purpose of providing a (e.g., centrally unified) request that the allocated memory be released at end of the acquisition mode active state. At the end of the acquisition mode active state, the receiver 302 sends memory release advisory 336 to the MMU 304 to notify the MMU 304 the previously allocated memory is going to be made available (e.g., soon) for use by other entities. In turn, the MMU 304 sends memory release advisory 338 to ancillary memory system 306 to notify the ancillary memory system 306 of the pending changes to the allocation of the memory previously allocated for use by the receiver 302.

During state 340, the receiver 302 relinquishes the memory previously allocated for (and used within) the acquisition mode active state. To relinquish the memory, the processor 302 sends the communication 342 to the MMU 304 to request initiating the process to relinquish memory previously allocated to the receiver 302. When the MMU 304 receives communication 342, the MMU 304 initiates the process of relinquishing the memory (e.g., by copying and reallocating the memory on a byte-by-byte basis). At the end of the acquisition mode active state, the receiver 302 sends communication 336 to the MMU 304 to notify the MMU 304 the previously allocated memory has been freed-up. In turn, the MMU 304 sends communication 346 to ancillary memory system 306 that the previously allocated memory has been freed-up (thus indicating, for example, that the ancillary memory system is free to reclaim any memory swapped with the general processor).

For example, as satellite channels are acquired, less and less memory is necessary (e.g., for fast satellite channel acquisition) even during the acquisition mode active state. During the acquisition mode active state, the MMU 304 is arranged to receive a request from a donating processor (such as the general processor 230) for the donating processor to reclaim the memory swapped (or otherwise made available for use by the receiver 302 processor). The MMU 304 is arranged to notify the receiver 302 (e.g., via communication 332) that the general processor (that has requested to reclaim the time-shared memory space). In response to the communication 332, the receiver 302 determines a slot of memory (e.g., eight kilobytes of RAM used for a channel that is no longer needed) to be returned for use by the general processor. After a DMA transfer of the contents of the corresponding (e.g., swapped) memory in the ancillary memory system 306, the MMU 304 modifies its memory map to allow the general processor to access the swapped memory contents as transferred in the returned slot.

Figure 4:
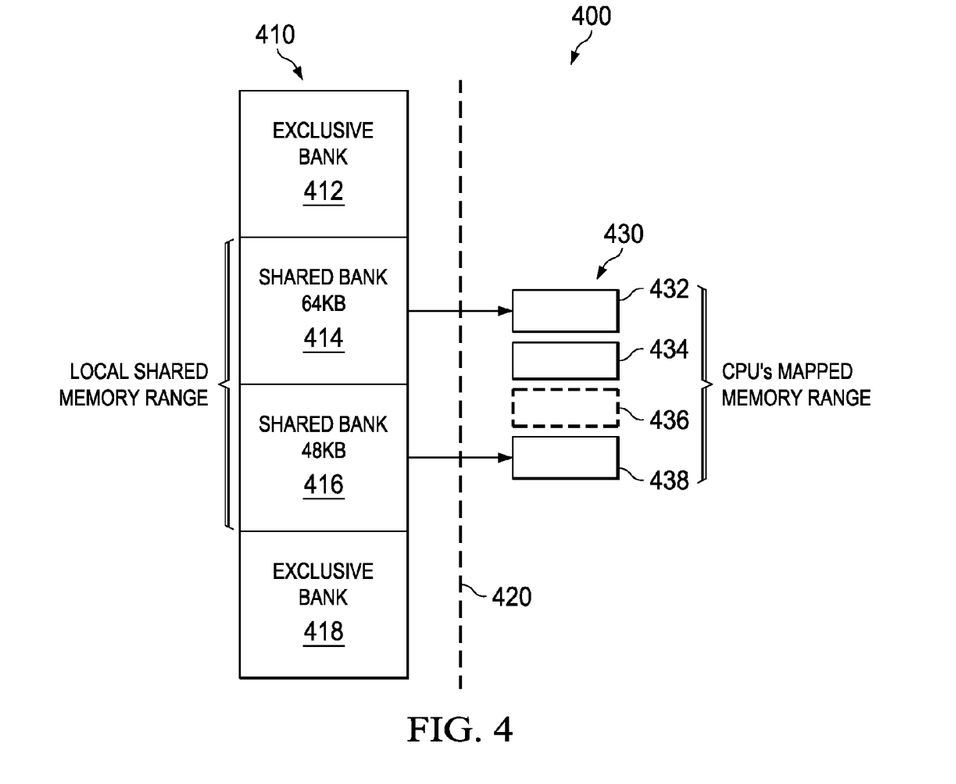
FIG. 4 is a memory allocation diagram that illustrates a memory map in a dynamic processor-memory revectoring system in accordance with example embodiments of the disclosure.

FIG. 4 is a memory allocation diagram that illustrates a memory map in a dynamic processor-memory revectoring system in accordance with example embodiments of the disclosure. Memory map 400 includes memory block 410. Memory block 410 is a portion (e.g., complete portion or less) of shared memory such as unified RANI 210. Memory block 410 includes exclusive bank 412, shared bank (e.g., 64 kB) 414, shared bank (e.g., 48 kB) 416, and exclusive bank 418. The exclusive banks 412 and 418 are banks in the memory block 410 that are not shared (and thus are not swapped and are reserved for the exclusive use of either the receiver processor 260 or the general processor 230).

Shared banks 414 and 416 fall within the mapped memory range 430 of the general processor 230, for example. Accordingly, the memory contents of the shared banks 414 can be swapped into banks (and/or sufficiently large slots) of memory in the ancillary memory 240 (represented here as boundary 420). The mapped memory range 430 includes memory banks 432, 434, 436, and 438 that are each large enough (or more than large enough) to include the contents of a bank of swapped memory. For example, bank 432 is large enough to receive the contents of shared bank 414 and bank 438 is large enough to receive the contents of shared bank 416. The one-to-one correspondence between the un-swapped memory location and the swapped memory location is stored in a memory map maintained (and used) by the MMU 240, for example. (Unused portions are handled as "holes" and discussed below with respect to FIG. 7 and following.)

The banks allocated to a selected range of addresses (such as bank 436) of the mapped memory range 430 are sufficiently large to handle memory of active or suspended operations performed by peripheral processors that are closely coupled to the ancillary memory 240. The peripheral processors can free-up memory for use by the general processor (as well as to save power) by reducing (e.g., suspending, curtailing, postponing, and the like) various processing tasks under their control during satellite channel acquisition.

Figure 5:
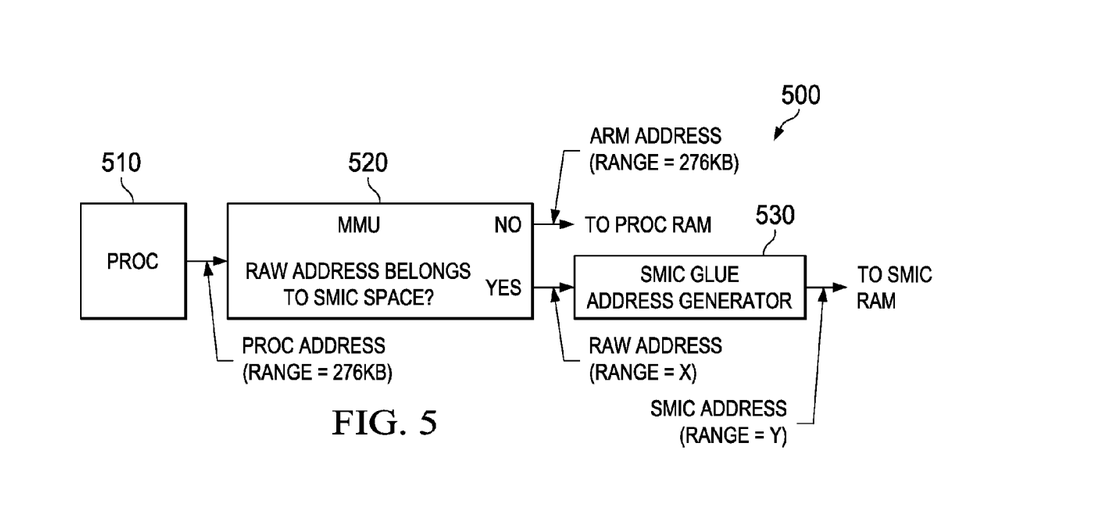
FIG. 5 is a block diagram that illustrates an address translation system in a dynamic processor-memory revectoring system in accordance with example embodiments of the disclosure.

FIG. 5 is a block diagram that illustrates an address translation system in a dynamic processor-memory revectoring system in accordance with example embodiments of the disclosure. Address translation system 500 includes a processor (PROC) 510 (such as general processor 230) that is arranged to generate raw (e.g., untranslated) addresses having an address range (for example, the general processor 230 has an address range of over around 276 kB).

An MMU 520 (such as a portion of MMU 220) is arranged to receive a raw address and to determine whether the received raw address falls within a portion of memory that has been mapped to swapped memory (e.g., falling with the memory space of the ancillary memory 240 that is accessed using an SMIC bus). When swap memory is requested for memory falling within range "X" of memory, the address for the swap memory is allocated from memory address range "Y" and the allocated memory address is stored by the MMU in a memory map to be used for address translation.

The MMU 520 determines whether the received raw address falls within a portion of memory that has not been mapped to swapped memory, the MMU 520 passes the request (untranslated) to a memory location having the normal (e.g., unswapped) address. If the received raw address falls within a portion of memory that has been mapped to swapped memory, the MMU 520 passes the request to the SMIC "glue" address generator 530 for translation.

The SMIC glue address generator 530 is arranged to receive a raw address (falling within range "X" generated by the processor 510) and to translate the received raw address to an address (falling within range "Y") that falls within the "mapped-to" address (such as provided by the ancillary memory 240). For example, memory can be allocated for swap memory using pages, where the pages have a physical address that can be determined using the raw address and the address of the page stored in the memory map. (Not all locations in the memory space map need be mapped to physical RAM.) Thus, the SMIC glue address generator 530 is arranged to translate the received raw address to corresponding (e.g., that maintains the one-to-one address correspondence) address of a location physically located in the ancillary memory 240 (e.g., that is accessed via the SMIC bus).

Figure 6:
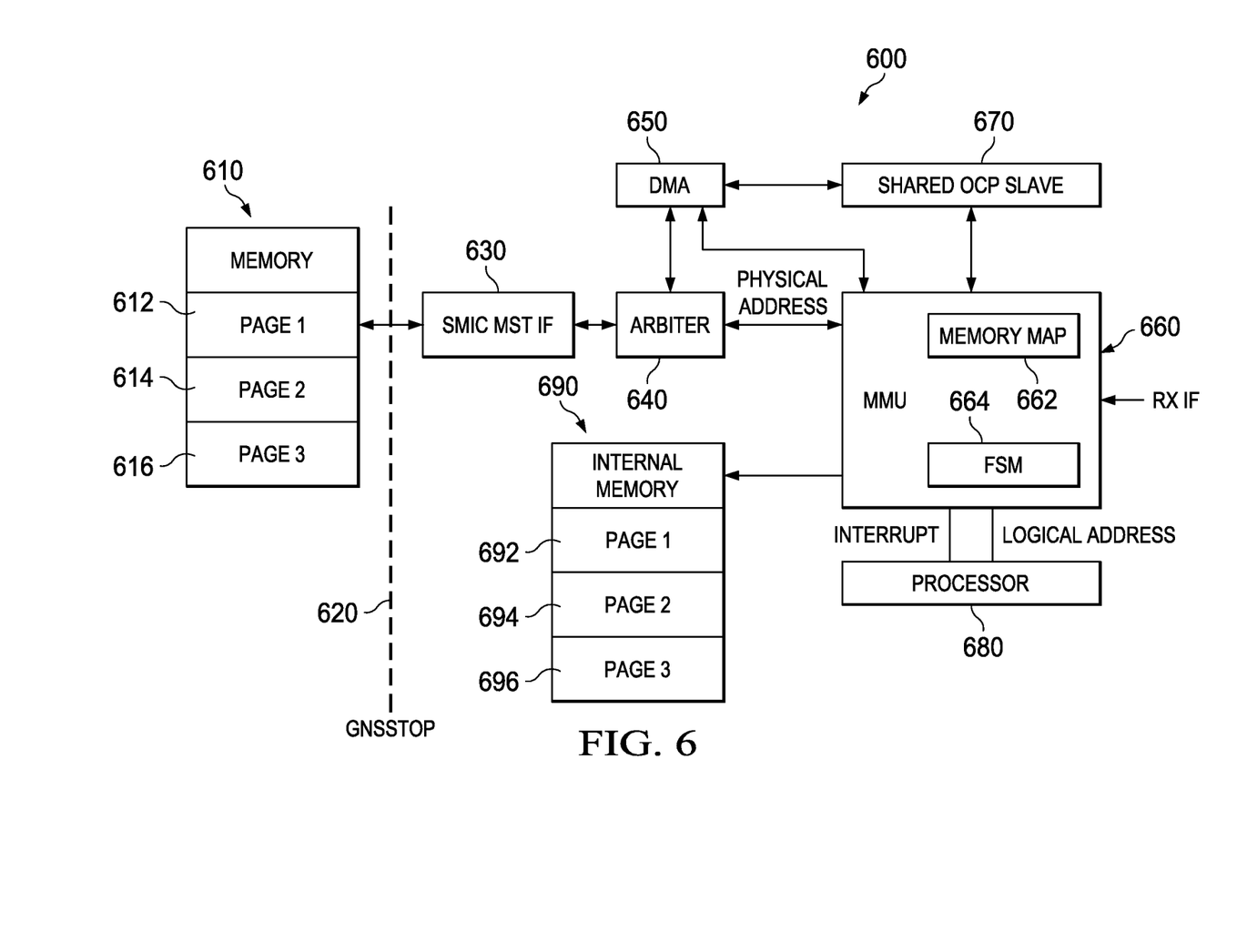
FIG. 6 is a block diagram that illustrates a memory management system in a dynamic processor-memory revectoring system in accordance with example embodiments of the disclosure.

FIG. 6 is a block diagram that illustrates a memory management system in a dynamic processor-memory revectoring system in accordance with example embodiments of the disclosure. Memory management system 600 includes a memory 610. Memory 610 is a memory such as ancillary memory 240 and includes pages 612, 614, and 616 that can be accessed using the logical or physical address. (Not all pages of internal memory 610 are shown for the purpose of clarity.)

Memory 610 is typically formed on the same substrate as other memory management system 600 components. However, memory 610 can be designed as a separate unit (as an "intellectual property" unit) that is designed separately from other memory system 600 components. The separation of the design boundary is shown, for example, by global navigation satellite stop (GNS STOP) boundary 620.

Communications (e.g., memory accesses) with the memory 610 can be accomplished (e.g., across GNS STOP boundary 620) via SMIC master interface (SMIC MST IF) 630 that controls the SMIC bus. The SMIC bus has a limited number of connections (e.g., three signals arranged as a serial bus) to facilitate the integration of the separately designed components onto a single substrate.

An arbiter 640 is arranged to arbitrate between memory accesses between DMA controller 650 and MMU 660 (which is an MMU such as MMU 220). Thus, arbiter 640 allows the DMA transfers (controlled by DMA controller 650) during memory swapping and direct memory access of the memory 610 during swapped operation (e.g., when the general processor is accessing memory contents swapped into the memory 610). The arbitrator 640 is typically provided physical addresses by the DMA controller 650 or the MMU 660.

The MMU 660 includes a finite state machine (FSM) 664 and the memory map 662 (as introduced above). The finite state machine 664 is arranged to control the state, and thus the functions, of the MMU 660. The MMU 660 controls the initiation and duration of the DMA transfers either directly or via the shared open connections protocol (OCP) slave 670. The MMU is responsive to interrupts and memory accesses by the processor 680 (such as general processor 230).

Processor 680 is arranged to interrupt the MMU 660, for example, to request relinquished memory (such as after the acquisition mode active state has been initiated). Processor 680 is further arranged to provide logical addresses of memory accesses to the MMU 660. If the logical address implicates a swapped address (e.g., an address that is mapped), the MMU 660 translates the logical address into a physical address and uses the physical address to forward the memory access (e.g., a data read or write operation) to the memory 610 via the arbiter 640. If the logical address has not been swapped (e.g., into memory 610), the MMU 660 uses the logical address to access the internal memory 690. The internal memory 690 includes pages 692, 694, and 696 that can be accessed using the logical or physical address. (Not all pages of internal memory 690 are shown for the purpose of clarity.) Accordingly, pages of memory can be swapped between the internal memory 690 and the memory 610 in accordance with requirements of each processor at a selected time.

Figure 7:
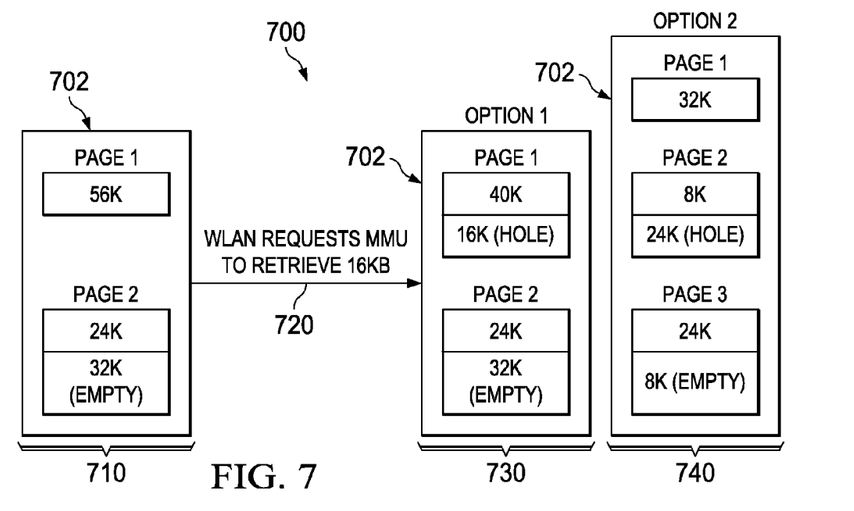
FIG. 7 is a memory allocation diagram that illustrates relinquishment of memory in a dynamic processor-memory revectoring system in accordance with example embodiments of the disclosure.

FIG. 7 is a memory allocation diagram that illustrates relinquishment of memory in a dynamic processor-memory revectoring system in accordance with example embodiments of the disclosure. Memory 702 is a shared memory such as unified memory 210. For purposes of clarity of illustration, memory 702 is shown as including Page 1 and Page 2 (in practice memory 702 typically includes many more such pages). Memory 702 is illustrated (in a first state 710) as having 80K of memory allocated (e.g., by the MMU) with 56K of memory in Page 1 and 24K of memory in Page 2 (with 32K of memory in Page 2 remaining unallocated).

In response to a request by a donating processor to reclaim donated memory, memory 702 undergoes transformation 720 to enter a state (such as state 730 or state 740) in which memory has been allocated for reclamation. State 730 illustrates a possible state where 16K of memory has been allocated for relinquishment (e.g., "hole") from the 56K-sized block of allocated memory in Page 1 (and with Page 2 remaining unchanged in size and allocation). Per the reallocation of memory in state 730, the receiver processor (which was previously allocated use of all 56K of memory in Page 1) is currently allocated a 40K-sized block within Page 1. The receiver is (e.g., still) able to access the remaining allocated portions (e.g., occupying a total of 64K) using (e.g., the same) 80K memory space used as in state 710. The 16K-sized block is a memory "hole" that is made available for allocation by the general processor, for example.

The SMIC glue address generator is arranged to access any memory location in any page of memory. For example, the SMIC glue address generator is arranged to generate any address within a range of 112K and thus can access any memory location in either Page 1 or Page 2. Thus, addressing of memory within the "holes" can be accomplished by the receiver processor using the original memory space (and, for example, the original address generation mechanisms) and be accomplished using the (e.g., virtually) expanded memory space as addressed by the SMIC glue address generator.

State 740 illustrates an alternative (e.g., to state 730) state where the page size has been decreased to 32K. The decreasing of the page size allows (for example) the same amount of memory as in state 730 (for a total of 64K of memory) to be allocated, but having a larger "hole" from which more memory can be relinquished. Per the reallocation of memory in state 740, the receiver processor (which was previously allocated use of all 56K of memory in Page 1) is currently allocated a 32K-sized block within Page 1, an 8K-sized block within Page 2, and a 24K-sized block within Page 3. The receiver is (e.g., still) able to access the remaining allocated portions (e.g., occupying a total of 64K) using (e.g., the same) 80K memory space used as in state 710. The 24-sized block is a memory "hole" that is made available for allocation by the general processor, for example.

The SMIC glue address generator is (for example) arranged to generate any address within a range of 112K and thus can access any memory location in Page 1, Page 2, and Page 3.

Figure 8:
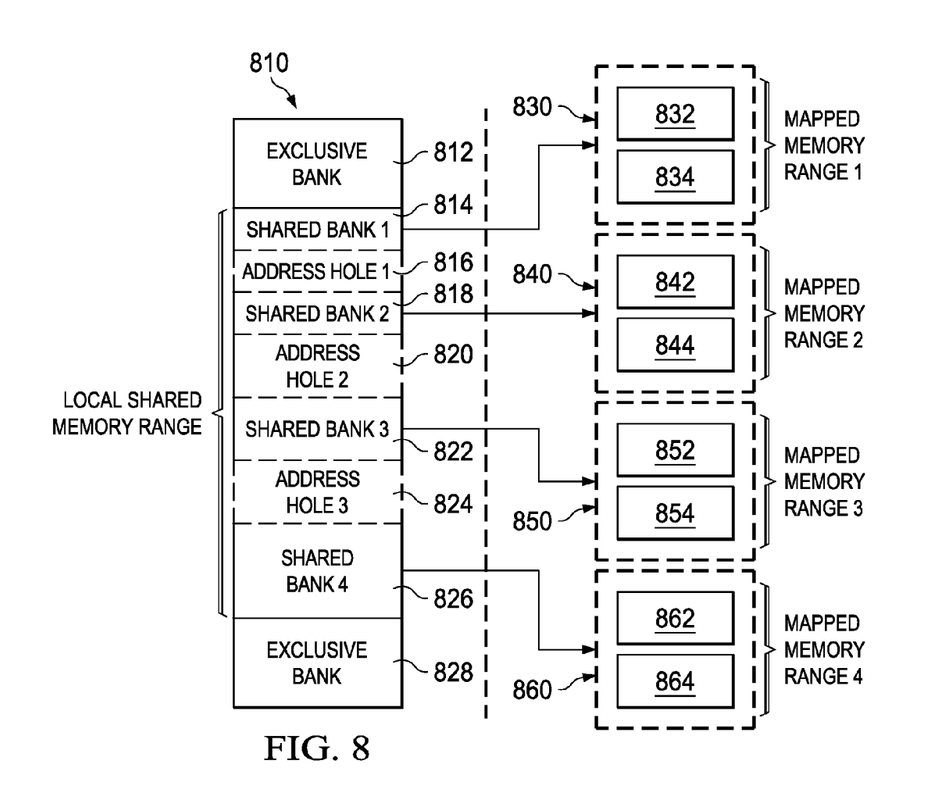
FIG. 8 is a memory allocation diagram that illustrates memory mapping of relinquished memory in a dynamic processor-memory revectoring system in accordance with example embodiments of the disclosure.

FIG. 8 is a memory allocation diagram that illustrates memory mapping of relinquished memory in a dynamic processor-memory revectoring system in accordance with example embodiments of the disclosure. Memory block 810 is a shared memory having memory allocation such as the memory allocation illustrated above for memory block 702. Memory 810 is likewise shown as including two exclusive banks (e.g., exclusive banks 812 and 828) and four shared banks (e.g., shared banks 814, 818, 822, and 826). Memory 810 includes four address holes (e.g., address holes 816, 820, 824, and 828) that each are associated with a shared bank (e.g., shared banks 814, 818, 822, and 826 respectively). Each address hole represents memory that has been relinquished (e.g., by the receiver processor) for use by the general processor (e.g., which has curtailed operation and/or "borrowed" memory to be relinquished by the general processor).

Address information for shared banks (which remain allocated to the receiver processor) is contained in a memory map that is maintained by the MMU (e.g, MMU 220) and/or registers of the receiver processor. Address information includes information that is sufficient to identify a starting and an ending location. For example, memory map entry 830 includes a starting address 832 and an ending address 834 that determine mapped memory range 1, memory map entry 840 includes a starting address 842 and an ending address 844 that determine mapped memory range 2, memory map entry 850 includes a starting address 852 and an ending address 854 that determine mapped memory range 3, and memory map entry 860 includes a starting address 862 and an ending address 864 that determine mapped memory range 4.

In an example embodiment, the general processor is arranged to have local memory access to memory locations having addresses that fall within the range of a memory hole (e.g., including starting and ending addresses) of the unified memory. In the embodiment, the unified memory is not a cache memory, which increases access times (e.g., by eliminating cache misses) and saves space and power consumption (e.g., which eliminates the requirement to store the same data in several memory locations). Access by the general processor to a range of memory within the memory hole is granted by MMU. Access by the general processor to guest memory within the ancillary memory is granted by MMU and is addressed using the SMIC address glue generator to generate the physical memory addresses in response to logical addresses (e.g., within the MMU memory space) that are generated by the second processor.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A processing system, comprising:
a memory management unit that is arranged to allocate and reallocate portions of memory for exclusive use by processors, the memory management unit including control inputs and a control output;
a GNSS (global navigation satellite system) receiver processor that includes receiver processor memory, and that is arranged to enter an initial satellite acquisition state for which the memory management unit allocates a first portion of the receiver processor memory and to enter a subsequent processing state in which the GNSS receiver processor relinquishes one or more portions of the first portion of the receiver processor memory in response to a relinquishment request, the receiver processor including a memory control input coupled with the memory control output of the memory management unit, and memory control outputs coupled with the memory control inputs of the memory management unit;
a general processor that is closely coupled to the receiver processor memory and is arranged to generate the relinquishment request and to receive allocation of the relinquished one or more portions of the first portion of the receiver processor memory by the memory management unit; and
an ancillary memory system that is arranged to provide ancillary memory as allocated by the memory management unit for use by the general processor during the initial satellite acquisition state, the ancillary memory system including a memory control output coupled with a memory control input of the memory management unit.

2. The system of claim 1, wherein the general processor is closely coupled to the receiver processor memory by using a parallel bus that provides zero-wait state access to the memory.

3. The system of claim 2, wherein the general processor is closely coupled to the provided guest memory by using a slow bus that is coupled to the provided guest memory, wherein the slow bus is slower than the parallel bus.

4. A method, comprising
allocating a first portion of a memory of a receiver processor memory during an initial satellite acquisition state in which a GNSS (global navigation satellite system) processor attempts to acquire multiple satellite channels for a location fix;
acknowledging a relinquishment request that is arranged to request relinquishment of one or more portions of the first portion of the receiver processor memory for use by a general processor;
relinquishing one or more portions of the first portion of the receiver processor memory in response to the relinquishment request after the GNSS processor has acquired at least one satellite channel;
allocating to the general processor one or more portions of the relinquished one or more portions of the receiver processor memory in response to the relinquishment request; and
accessing the relinquished one or more portions of the receiver processor memory by using a closely coupled bus that is common to the receiver processor memory and to the general processor.

5. The method of claim 4, including allocating ancillary memory for use by the general processor during the initial satellite acquisition state, wherein data stored in the allocated ancillary memory is accessible by the general processor at a slower rate than is the rate at which data stored in the receiver processor memory is accessible by the general processor.

6. The method of claim 5, including transferring contents of the allocated ancillary memory to a local memory of the general processor after contents of the local memory of the general processor have been transferred to the relinquished one or more portions of the receiver processor memory.

* * * * *